(12) United States Patent
Gonsalves et al.

(10) Patent No.: US 7,934,089 B2
(45) Date of Patent: *Apr. 26, 2011

(54) SYSTEM AND METHOD FOR PROCESSING DATA AND COMMUNICATING ENCRYPTED DATA

(75) Inventors: Brian Gonsalves, Pleasanton, CA (US); Kenneth Roger Jones, Cool, CA (US); Zesen Chen, Pleasanton, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/604,632

(22) Filed: Oct. 23, 2009

(65) Prior Publication Data

US 2010/0042829 A1 Feb. 18, 2010

Related U.S. Application Data

(63) Continuation of application No. 11/787,810, filed on Apr. 18, 2007, now Pat. No. 7,627,749, which is a continuation of application No. 10/392,286, filed on Mar. 19, 2003, now Pat. No. 7,225,329.

(51) Int. Cl.
*H04L 29/06* (2006.01)
*H04K 1/00* (2006.01)
*G01R 31/08* (2006.01)
(52) U.S. Cl. .................. 713/153; 380/255; 370/231
(58) Field of Classification Search .............. 713/153; 380/255; 709/299
See application file for complete search history.

(56) References Cited

U.S. PATENT DOCUMENTS

| | | | |
|---|---|---|---|
| 4,160,120 A | 7/1979 | Barnes et al. | |
| 4,377,862 A | 3/1983 | Koford et al. | |
| 4,645,871 A | 2/1987 | Bremer et al. | |
| 4,661,657 A | 4/1987 | Grenzebach et al. | |
| 5,048,087 A | 9/1991 | Trbovich et al. | |
| 5,077,794 A | 12/1991 | Taylor | |
| 5,311,596 A | 5/1994 | Scott et al. | |
| 5,369,703 A | 11/1994 | Archibald et al. | |
| 5,636,282 A | 6/1997 | Holmquist et al. | |
| 5,675,732 A | 10/1997 | Majeti et al. | |
| 6,144,638 A * | 11/2000 | Obenhuber et al. | 370/231 |
| 6,230,203 B1 | 5/2001 | Koperda et al. | |
| 6,618,385 B1 * | 9/2003 | Cousins | 370/401 |
| 6,751,729 B1 * | 6/2004 | Giniger et al. | 713/153 |
| 6,765,885 B2 | 7/2004 | Jiang et al. | |
| 6,847,609 B1 * | 1/2005 | Sarnikowski et al. | 370/229 |
| 7,072,861 B1 | 7/2006 | Yamanaka et al. | |
| 2002/0104016 A1 | 8/2002 | Pan et al. | |

* cited by examiner

*Primary Examiner* — Techane J Gergiso
(74) *Attorney, Agent, or Firm* — Toler Law Group

(57) ABSTRACT

Systems and methods for processing data and communicating encrypted data are provided. A method of processing data and communicating encrypted data may include receiving input traffic data at a first interface of a channel service unit/data service unit (CSU/DSU). The method may also include encrypting management data associated with the input traffic data at the CSU/DSU to produce encrypted management data. The method may further include sending the encrypted management data via a second interface of the CSU/DSU to a remote terminal of a local area network via a data router coupled to the CSU/DSU.

17 Claims, 5 Drawing Sheets

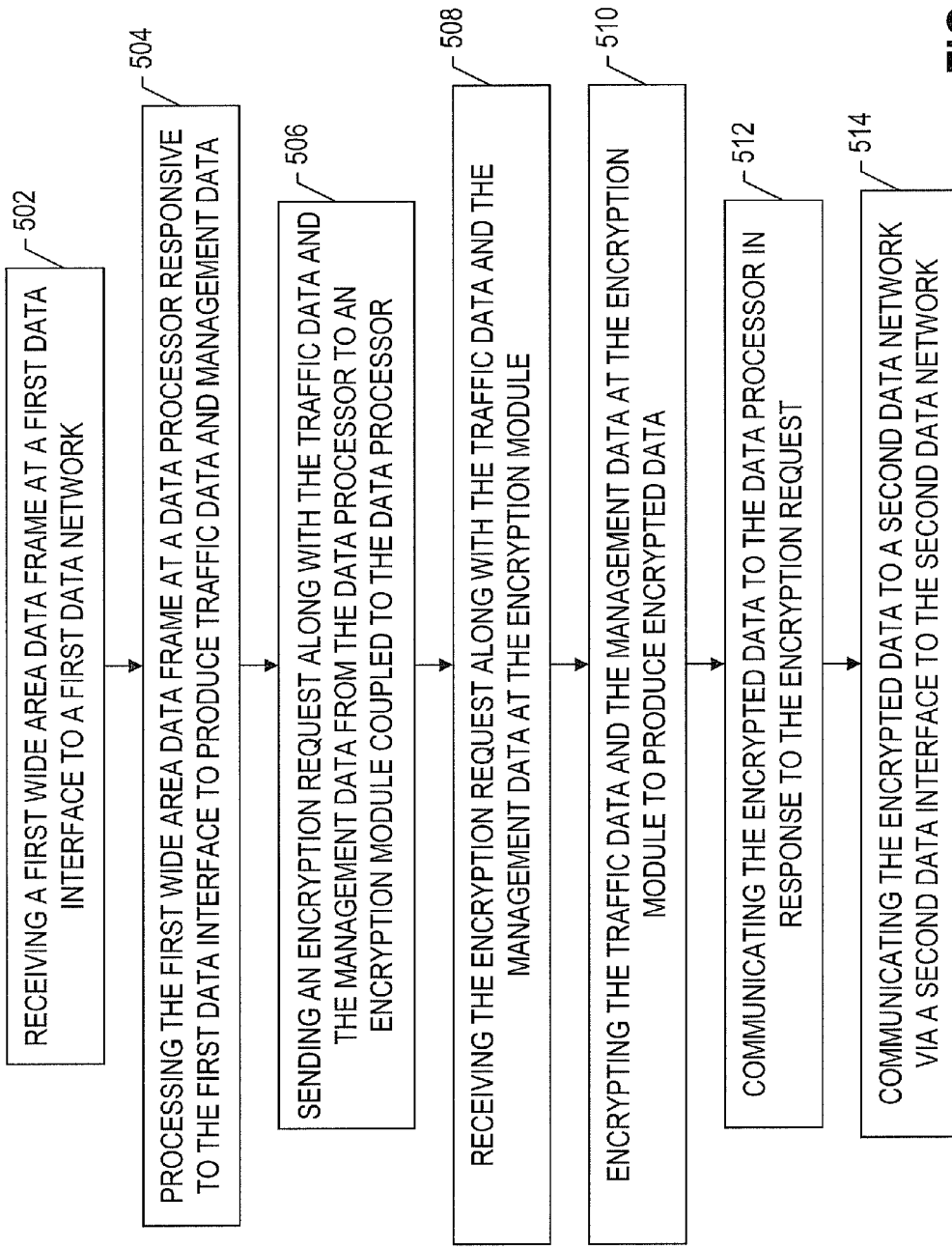

SYSTEM AND METHOD FOR PROCESSING DATA AND COMMUNICATING ENCRYPTED DATA

CLAIM OF PRIORITY

The present application claims priority from and is a continuation of patent application Ser. No. 11/787,810 filed on Apr. 18, 2007, which claims priority from and is a continuation of patent application Ser. No. 10/392,286 filed on Mar. 19, 2003, now U.S. Pat. No. 7,225,329 issued on May 29, 2007, the contents of which are expressly incorporated herein by reference in their entirety.

FIELD OF THE DISCLOSURE

The present disclosure relates generally to communication nodes and methods of processing data at such nodes.

BACKGROUND

Communication nodes located between wide area networks and local area data networks have been deployed commercially. An example of a communication node is a channel service unit/data service unit (CSU/DSU). CSU/DSU units that are available for deployment receive and forward traffic data and may also communicate various management data, such as performance report data and network management information. Such management data may contain company confidential information leading to a desire for increased security during communications.

BRIEF DESCRIPTION OF THE DRAWINGS

FIG. 5 is a flow chart that illustrates further details as to operation of the communication node.

The use of the same reference symbols in different drawings indicates similar or identical items.

DETAILED DESCRIPTION

Figure 1:
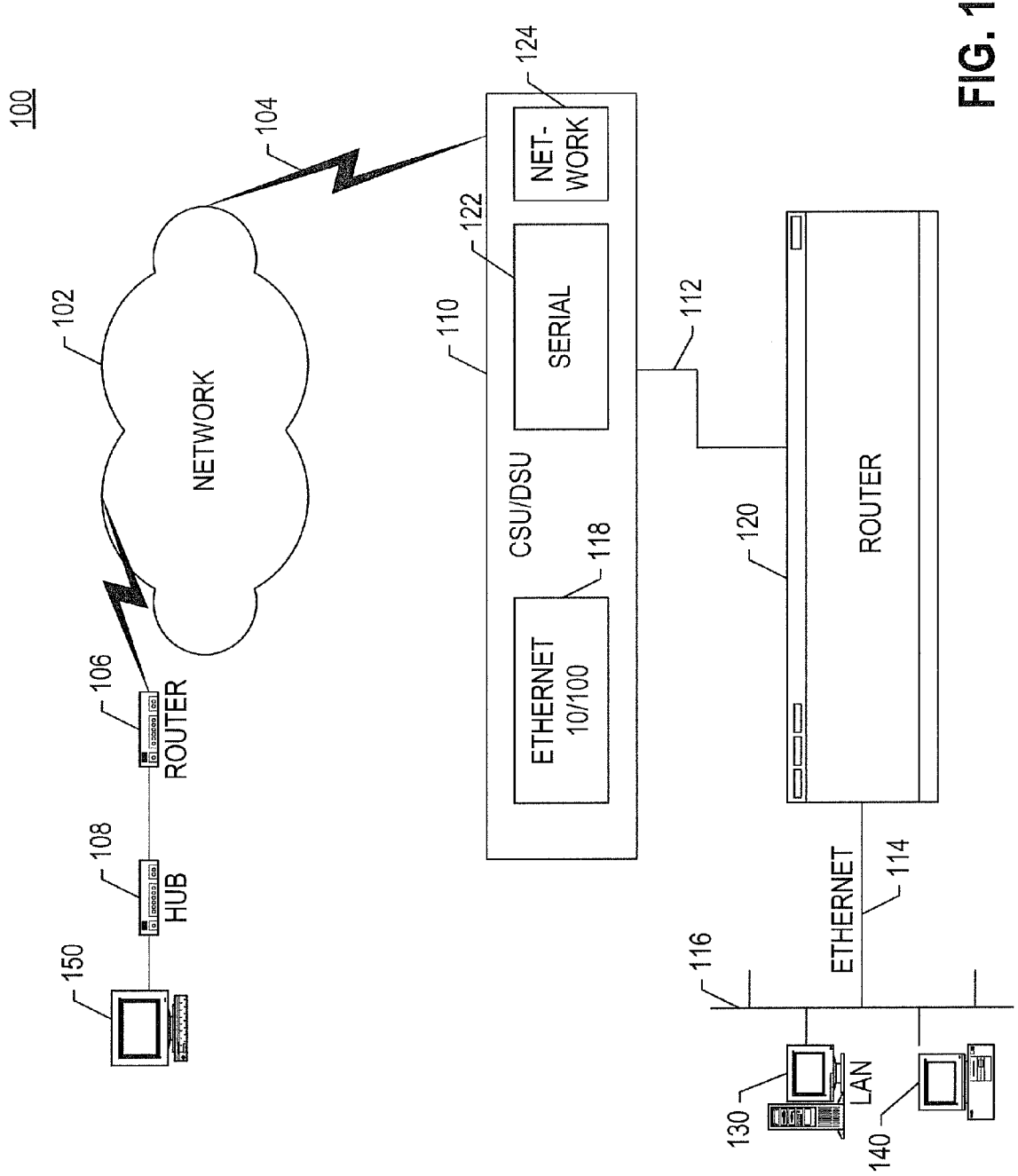
FIG. 1 is a general diagram that illustrates a communication node within a data network.

In a particular embodiment, a data communication node coupled to a first data network and coupled to a second data network is disclosed. The first data network is a wide area data network. The data communication node includes a first data interface to the first data network, a second data interface to the second data network, a data processor responsive to the first data interface and to the second data interface, and an encryption module coupled to the data processor. The first data interface is a telephony type interface and the second data interface is a packet data interface. The data processor receives input traffic data carried over the first data interface and generates management performance data based on measurements with respect to the input traffic data. The encryption module is to receive the management performance data to produce encrypted management performance data to be communicated to the second data network via the second data interface.

In another embodiment, a method of processing data and of communicating encrypted data is disclosed. The method includes receiving input data from a first interface, the first interface responsive to a wide area network; processing the input data using a data processing device to produce traffic data and management data associated with the input data; performing encryption on the traffic data and the management data to produce encrypted data; and communicating the encrypted data via a second interface to a local area network.

In another embodiment, a method of handling encrypted data at a data network router is disclosed. The method includes receiving encrypted data at a data network router, the encrypted data received from a communication node coupled to the data network router and coupled to a wide area network, the encrypted data associated with traffic data and management data; and communicating the encrypted data from the data network router to a remote node within a local area data network.

In another embodiment, a method of using data communications equipment coupled to a first data network and coupled to a second data network is disclosed. The first data network is a wide area data network and the second data network is a local area network. The method includes receiving a first wide area data frame at a first data interface to the first data network; processing the first wide area data frame at a data processor responsive to the first data interface to produce traffic data and management data; sending an encryption request along with the traffic data and the management data from the data processor to an encryption module coupled to the data processor; receiving the encryption request along with the traffic data and the management data at the encryption module; encrypting the traffic data and the management data at the encryption module to produce encrypted data; communicating the encrypted data to the data processor in response to the encryption request; and communicating the encrypted data to the second data network via a second data interface to the second data network.

Referring to FIG. 1, a communication system 100 is disclosed. The communication system 100 includes a first data network 102, a channel service unit/data service unit (CSU/DSU) communication node 110, a data router 120, and a second data network 116. The data router 120 is coupled to the second data network 116 via Ethernet connection 114. The second data network 116 is coupled to various peripheral equipment, such as local area network 130 and end terminal 140. The CSU/DSU 110 is coupled to the first data network 102. The first data network 102 is coupled to router 106, router data hub 108, and terminals, such as terminal 150. The CSU/DSU 110 includes Ethernet interface 118, a network interface 120, and serial interface 122.

Figure 2:
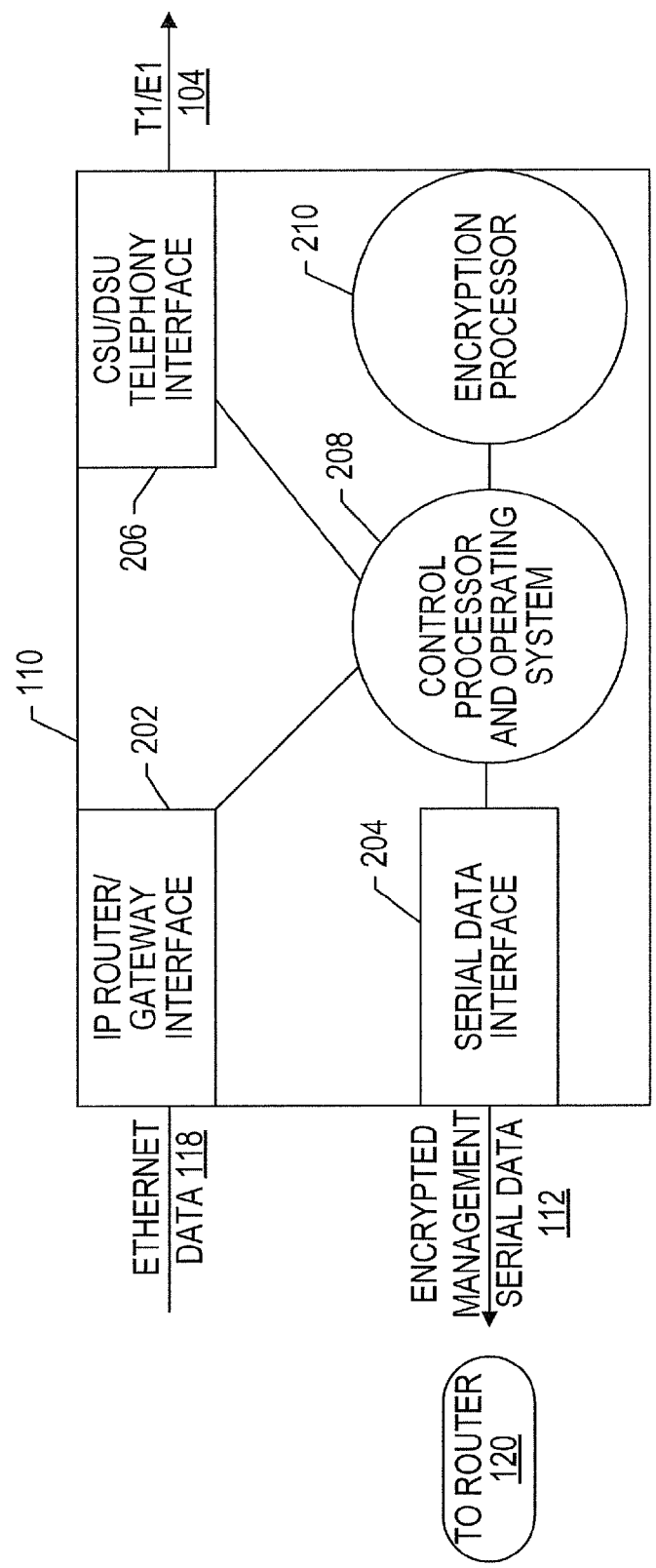
FIG. 2 is a block diagram of an embodiment of a communication node.

Referring to FIG. 2, a further description of the CSU/DSU 110 is illustrated. The CSU/DSU 110 includes a first data interface, such as an IP router/gateway interface 202 and a second interface, such as the CSU/DSU telephony interface 206. In addition, the CSU/DSU 110 includes serial data interface 204. CSU/DSU 110 further includes a control processor and operating system 208 and special purpose encryption processor 210. The control processor 208 is coupled to the IP router/gateway interface 202, the telephony interface 206, the serial data interface 204, and the encryption processor 210. The IP router/gateway interface 202 is coupled to Ethernet data interface 118, and the CSU/DSU telephony interface 206 may be coupled to a T1/E1 telephony telecommunication link 104. The serial data interface 204 is coupled to a data network router 120 via encrypted management serial data link 112.

During operation, the IP router/gateway interface 202 may receive Ethernet data via Ethernet data interface 118 and may forward such data to the control processor 208. Similarly, the telephony interface 206 may receive data over the telephony link, such as T1/E1 link 104, and such data may be forwarded to the control processor 208. Thus, the control processor 208 has access to both local network data such as through Ethernet data interface 118 and to wide area data that may be communicated via a wide area network over a telephony interface 206. The control processor 208, based on various processing of the input data, produces management data and performance data including network management data. The management data may also include measurements related to the input traffic data. The management data is passed to encryption processor 210. Encryption processor 210 encrypts the management data and optionally also encrypts the input traffic data to produce a combined encrypted data stream. The encrypted data is passed back to control processor 208 and the encrypted data is forwarded, via serial data interface 204, to router 120 over the serial data link 112. In this manner, both traffic data to be passed via CSU/DSU 110, as well as management related data, may be encrypted by the CSU/DSU 110 prior to being communicated to router 120.

Figure 3:
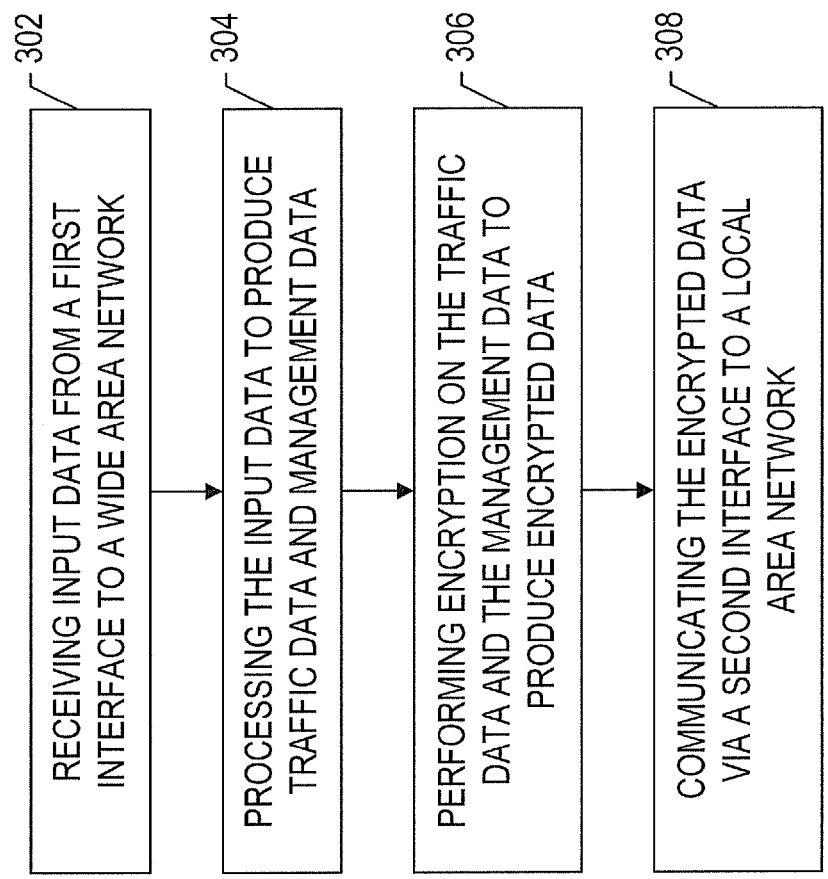
FIG. 3 is a flow chart that illustrates operation of the communication node.

Referring to FIG. 3, a method of operation is further described with respect to CSU/DSU 110. Input data is received from a first interface to a wide area network, at step 302. The input data is processed to produce traffic data and management data, at 304. Encryption is performed on the traffic data and the management data to produce encrypted data, at step 306, and the encrypted data is communicated to a second interface to a local area network, at step 308.

Figure 4:
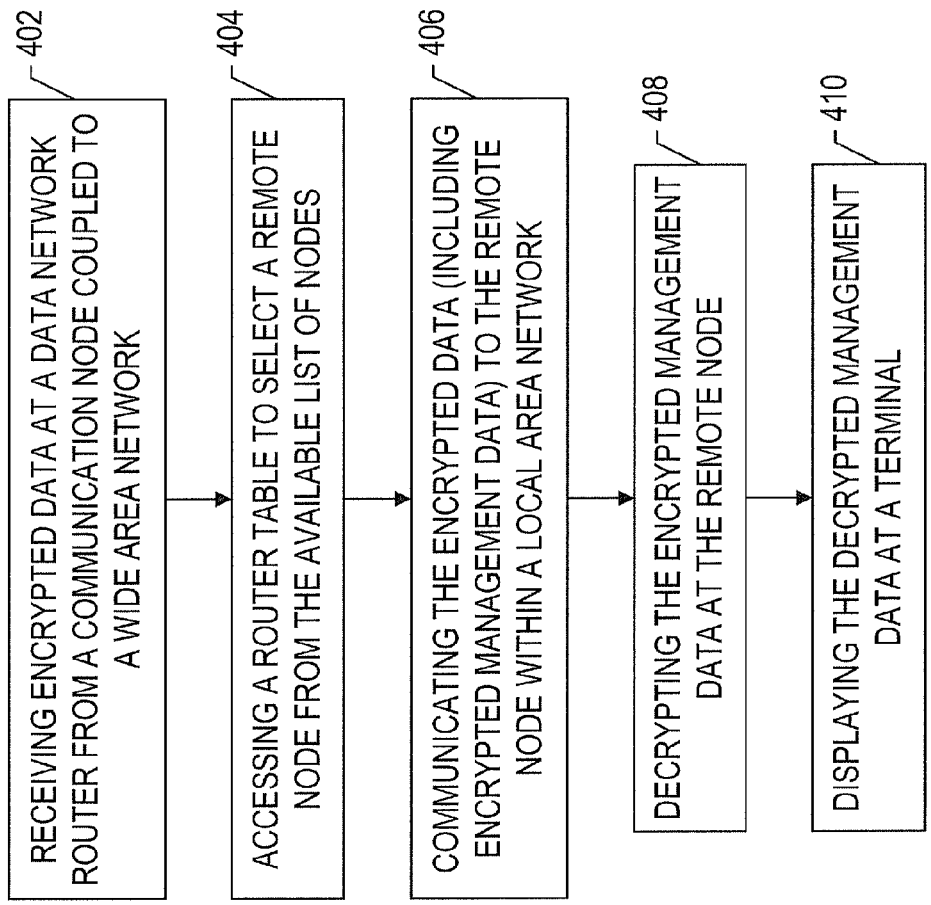
FIG. 4 is a flow chart that illustrates operation at a data router coupled to the communication node.

Referring to FIG. 4, another method of operation with respect to the CSU/DSU 110 is illustrated. In this particular method, encrypted data is received at a data network router from a communication node coupled to a wide area network, at step 402. An example of the communication node is the CSU/DSU 110 coupled to the wide area network via a telephony interface. A router table is then accessed at the data network router to select a remote node from an available list of nodes, at step 404. The encrypted data is communicated, including encrypted management data, to the remote node within a local area network, as shown at step 406. The encrypted management data is then decrypted at the remote node, at step 408, and the decrypted management data is displayed at a terminal, at step 410. The end user of the terminal may thereby view the management data.

Referring to FIG. 5, further details regarding operation of a communication system that includes an enhanced CSU/DSU with data encryption capability is shown. A first wide area data frame is received at a first data interface to a first data network, at step 502. The first wide area data frame is processed at a data processor that is responsive to the first data interface to produce traffic data and management data, at step 504. An encryption request is sent along with the traffic data and the management data from the data processor to an encryption module that is coupled to the data processor, at step 506. The encryption request for the data is received along with the traffic data and the management data at the encryption module, as shown at step 508. The traffic data and the management data is encrypted at the encryption module to produce encrypted data, at step 510. Encrypted data is communicated to the data processor in response to the encryption request, at step 512, and the encrypted data is communicated to a second data network via the second data interface, as shown at step 514. In this manner, traffic data and associated management data may be encrypted within a communication node that is coupled to both a wide area data network as well as a local area network, and such encrypted data is passed to the second data network in encrypted form. A benefit of such implementation is that the second data network receives encrypted data and may thereby eliminate the step of requiring encryption capability, whether software and/or hardware, at the second data network. Removing expensive encryption functionality from the router provides an economic benefit due to the cost savings.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
a channel service unit/data service unit (CSU/DSU) having a first data interface and a second data interface, wherein the CSU/DSU produces management data that includes at least performance measurements related to input traffic data received via at least one of the first data interface and the second data interface, wherein the CSU/DSU encrypts the management data and the input traffic data, and wherein the CSU/DSU sends the encrypted management data and the encrypted input traffic data to a remote terminal of a local area network; and
a data router coupled to the CSU/DSU to route the encrypted management data and the encrypted input traffic data to the remote terminal, wherein the data router is separate from and external to the CSU/DSU.

2. The system of claim 1, wherein the first data interface is configured to communicate via a wide area network and wherein the second data interface is configured to communicate via the local area network.

3. The system of claim 1, wherein the first data interface is configured to communicate via a telephony type network and wherein the second data interface is configured to communicate via the local area network.

4. The system of claim 1, wherein the data router does not have encryption capability.

5. The system of claim 1, wherein the CSU/DSU comprises an encryption module implemented as a hardware element to encrypt the management data.

6. The system of claim 1, wherein the CSU/DSU comprises a non-transitory computer-readable storage medium that stores instructions to encrypt the management data.

7. The system of claim 1, wherein the remote terminal includes a network management workstation.

8. The system of claim 1, wherein the CSU/DSU performs data encryption standard (DES) encryption with respect to the management data.

9. The system of claim 1, wherein the first data interface is configured to communicate via a digital telephony line.

10. The system of claim 1, wherein the CSU/DSU sends the encrypted management data to the remote terminal via a serial data interface.

11. The system of claim 1, wherein the management data further includes at least one of service level data, network management data, configuration data, and error reporting data.

12. A method of processing data and communicating encrypted data, the method comprising:
receiving input traffic data at a first interface of a channel service unit/data service unit (CSU/DSU);
producing management data that includes at least performance measurements related to the input traffic data;

encrypting the management data and the input traffic data at the CSU/DSU to produce encrypted management data and encrypted input traffic data; and sending the encrypted management data and the encrypted input traffic data via a second interface of the CSU/DSU to a remote terminal of a local area network via a data router coupled to the CSU/DSU, wherein the data router is separate from and external to the CSU/DSU.

13. The method of claim 12, wherein the encrypted management data is sent to the remote terminal via a serial data interface of the CSU/DSU.

14. The method of claim 12, wherein the first interface comprises an Ethernet interface.

15. The method of claim 12, wherein the first interface comprises a telephony type interface.

16. The method of claim 12, wherein the management data further includes at least one of service level data, network management data, configuration data, and error reporting data.

17. A non-transitory computer-readable storage medium comprising instructions that, when executed by a processor, cause the processor to:

receive input traffic data at a first interface of a channel service unit/data service unit (CSU/DSU);

produce management data that includes at least performance measurements related to the input traffic data;

encrypt the management data and the input traffic data at the CSU/DSU to produce encrypted management data and encrypted input traffic data; and send the encrypted management data and the encrypted input traffic data via a second interface of the CSU/DSU to a remote terminal of a local area network via a data router coupled to the CSU/DSU, wherein the data router is separate from and external to the CSU/DSU.

* * * * *